United States Patent [19]
Ando et al.

[11] 3,881,568
[45] May 6, 1975

[54] UNATTENDED TRAVELLING VEHICLE SYSTEM

[75] Inventors: Shimon Ando; Koji Kurokawa, both of Hitachi; Shizuo Suzuki, Naka; Isamu Komatsu, Takahagi; Toshitaka Suzuki, Hitachi; Shigeyoshi Kawano, Hitachiohta; Masayoshi Sunada; Kengi Natsuno, both of Hitachi, all of Japan

[73] Assignee: Hitachi, Ltd., Tokyo, Japan

[22] Filed: Nov. 30, 1972

[21] Appl. No.: 310,956

[30] Foreign Application Priority Data
Nov. 30, 1971 Japan .................. 46-96875

[52] U.S. Cl. ................ 180/98; 180/79.1; 250/202
[51] Int. Cl. ............................................ B60k 29/00
[58] Field of Search ............ 180/98, 79, 79.1, 79.2

[56] References Cited
UNITED STATES PATENTS

| | | | |
|---|---|---|---|
| 2,074,251 | 3/1937 | Broun | 180/79.1 |
| 2,331,144 | 10/1943 | Sitter | 180/79.1 |
| 2,424,288 | 7/1947 | Severy | 180/79.1 |
| 2,493,755 | 1/1950 | Ferrill | 180/98 |
| 2,999,938 | 9/1961 | Hann et al. | 180/98 |
| 3,172,496 | 3/1965 | Robinow et al. | 180/79 |
| 3,708,668 | 1/1973 | Tilley | 180/98 |

*Primary Examiner*—Robert J. Spar
*Assistant Examiner*—Ross Weaver
*Attorney, Agent, or Firm*—Craig & Antonelli

[57] ABSTRACT

In an unattended traveling vehicle which travels along a predetermined traveling path without an operator, an optical device provided at the underside of the vehicle has a light source and a light detector to receive the reflected light from a guide band arranged on a traveling surface of the path. The light detector has a width substantially the same as that of the vehicle, and therefore detects a quantity proportional to shift of the vehicle from the guide band. Thereby, the traveling direction of the vehicle is corrected, and simultaneously various signals can be applied to the vehicle by providing the band with various configurations.

9 Claims, 10 Drawing Figures

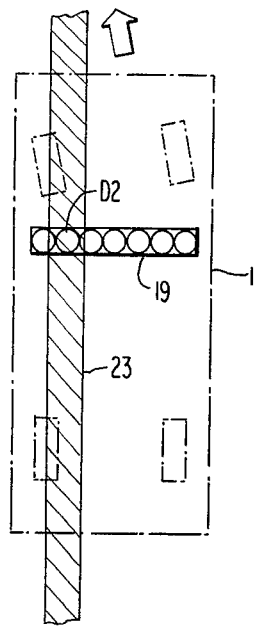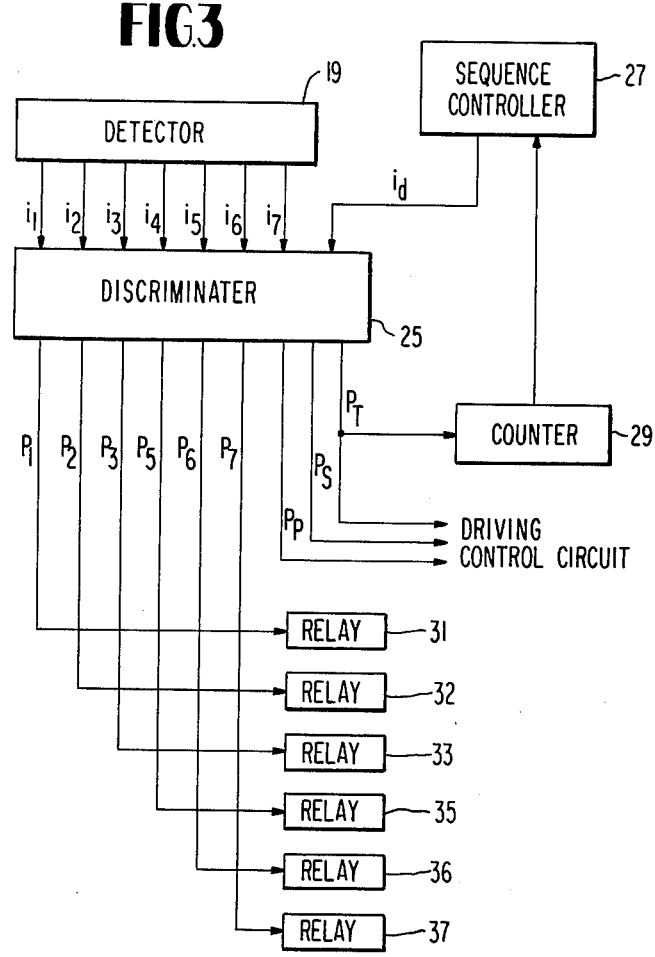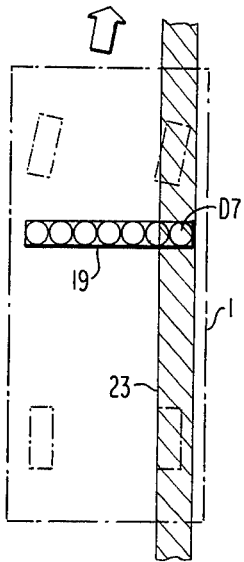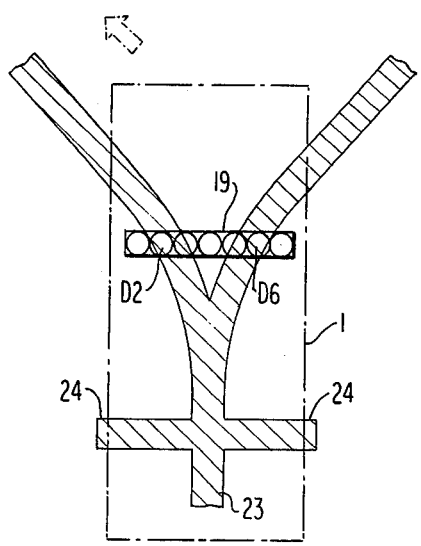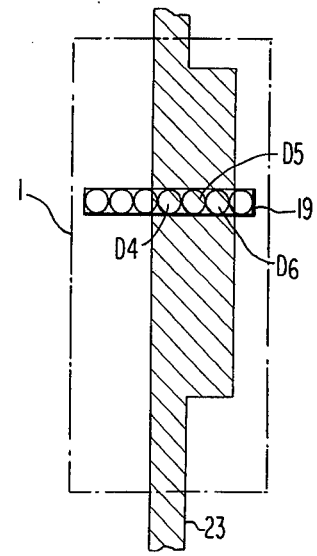

UNATTENDED TRAVELLING VEHICLE SYSTEM

BACKGROUND OF THE INVENTION

The present invention relates to a traveling apparatus for use in carrying a load, and more particularly to an automatic traveling vehicle which runs with no operator thereon.

A vehicle as mentioned above is often used in the transportation of goods, but it may also be used to transport men, animals, etc. The field of application of such a vehicle is not restricted to an embodiment thereof as will be stated below, but it is applicable to various transportation devices. However, as an example, a vehicle for the transportation of goods will be described hereinafter.

Such a vehicle is used in load transporting apparatus for use in a production line of a factory carrying out mass production or of an assembly plant. Further, it is used in transporting apparatus for connection among the respective production lines, and for warehousing and delivery from the terminal or initial point of a production line to a warehousing or delivering place and from the respective places to a storehouse, etc. At present, such transportation is conducted by means of a hoist, a traveling crane, a motorcar with a fork, a handcart, and so forth.

Especially the hoists, the traveling crane, etc., among the above-mentioned equipment are usually furnished throughout a mass production factory and an assembly plant. In some cases, however, alteration of the layout of the assembling positions, or complicated transportation as is required when a model change of the products is undertaken, leads to the necessity for changing the disposition of the traveling rails of the traveling cranes, hoists, etc., in conformity with the new layout. This requires a great deal of expense and labor. Conversely, the layout alteration cannot be simply made since the transporting facilities cannot be easily rearranged. In some cases, it is more advantageous in point of time to build an entirely new factory.

There has been for a fairly long time the need to transport a load (work) automatically (in an unattendant manner or without a man) from one specific place to another. As one means therefor, there has been a technique by which guiding electric waves of a specified frequency are radiated from a guiding electric wire disposed along the path to be traveled, and an unattended traveling vehicle receives the radiated electric waves and is guided thereby along the proper path. This technique, however, requires a guiding electric wire along the entire length of the path. Besides, since the guiding electric wire normally must be buried under a floor, the construction for burying it is very troublesome.

There has also been a system in which the guiding of the vehicle is conducted using a wireless set or the like. With such a system, however, complicated movements in a small place, such as an automatic warehouse, are very difficult, or next to impossible. Accordingly, apparatus for the unattended transportation of the load, etc., usually attains the necessary positional accuracy by utilizing traveling rails or the like. Among such unattended loading and unloading machines utilizing traveling rails, the so-called automatic hoist is included. It has the disadvantage that the facilities are elaborate, and that the alteration of the layout is economically impossible, as previously stated.

Hitherto, various optical guide systems for guiding the vehicle have been provided in order to eliminate the above disadvantages. The optical guide system is one in which a floor is provided with lines having a different reflection factor from the floor drawn thereon or tape pieces similarly different in reflection factor stuck thereto, and a traveling vehicle is guided and operated while detecting the difference of the reflection factor of the lines therebeneath. According to these systems, the tape pieces are merely stuck on the floor or the lines are drawn on the floor. Therefore, when they become unnecessary, the lines may be erased or the tape pieces may be torn off. This job is very simple, and immediate alteration to a new layout is possible.

In a conventional optical guide system, however, when the detector device for detecting the reflected light, such as a photodiode, a phototransistor and a CdS cell, becomes incapable of detecting the reflected light from the so-called reflection band of the line, the tape or the like, due to a wide deviation of the vehicle, the unattended traveling vehicle becomes incapable of detecting whether it is presently located on the right or left of the reflection band. As a result, the traveling vehicle often advances in the direction which makes it become more distant from the reflection band.

SUMMARY OF THE INVENTION

An object of the present invention is to provide a transportation apparatus having an optical guide system which makes the transportation apparatus more closely follow the running path.

Another object is to provide a transporation apparatus capable of performing various operation modes in response to different reflection patterns.

According to an embodiment of the present invention, the transportation apparatus has an optical guide system which is capable of detecting a shift of the path of the transportation apparatus and to discriminate between various magnitudes of deviation to either side, and which controls the steering angle in response to the quantity and direction of the shift.

Other objects of the present invention and the features which we desire to protect herein will become apparent upon reading the specification and inspection of the drawings and will be particularly pointed out in the appended claims.

BRIEF DESCRIPTION OF THE DRAWINGS

FIGS. 3 and 4 are schematic circuit diagrams which show a control circuit for steering the vehicle;

DETAILED DESCRIPTION OF THE PREFERRED EMBODIMENT

The preferred embodiment of the present invention will be described hereinafter with reference to the drawings.

Figure 1A:
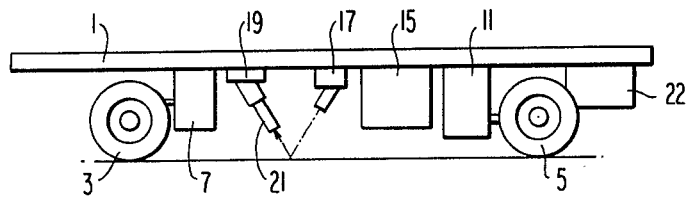
FIGS. 1a and 1b show a side view and a plan view, respectively, of an unattended vehicle according to an embodiment of the present invention.
Figure 1B:
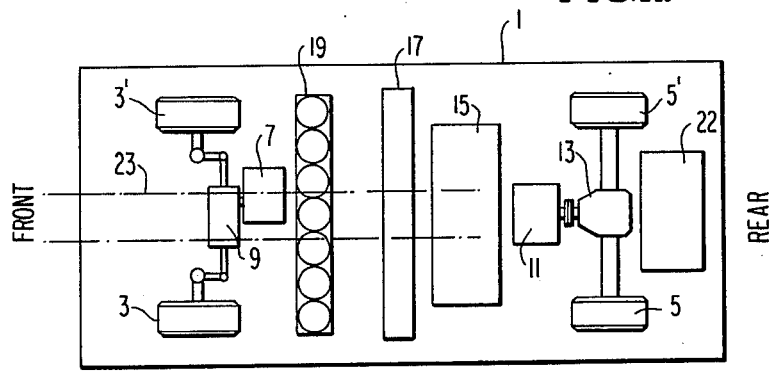

In FIGS. 1a and 1b, an optical guide system in accordance with an embodiment of the invention is provided on a truck 1, which is supported by four wheels 3, 3' and 5, 5'. The suspension mechanism disposed between the truck 1 and the wheels 3, 3' and 5, 5' is omitted from the figures in order to simplify the illustrated embodiment. Among these wheels, the wheels 3 and 3' are mounted for steerage of the vehicle, while the wheels 5 and 5' are drive wheels. A steering motor 7 steers the wheels 3 and 3' through a steering mechanism including a steering gear 9. The wheels 5 and 5' are driven by a driving motor 11 through a differential gear 13. A battery 15 supplies the electric power to the steering motor 7, the driving motor 11 and the other various control circuit devices, as will be described hereafter. A light source 17, which is mounted on the underside of the truck 1, produces light, especially in the form of beams, extending across the width of the vehicle. Similarly, on the underside of the truck 1, a light receiving device or detector 19 is mounted at a position at which the light beams emerging from the light source 17 are received after the beams are reflected by the surface of a running floor.

Figure 2:
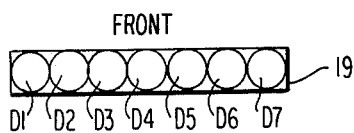
FIG. 2 shows a detector arrangement in the embodiment shown in FIGS. 1a and 1b.

The detecting elements of the detector 19 are arranged as shown in FIG. 2. Respective elements are designated $D_1$ to $D_7$ extending from the left to the right. As the elements, various elements such as a CdS cell, a phototransistor and a photodiode, can be used. Each element has a hood 21 of suitable length in order to prevent the respective elements from interfering with each other and to thereby ensure reliable operation. Numeral 22 designates a control device, the internal structure of which will be described hereinafter in connection with FIG. 4, the function of the control device 22 being to decide the destination of the vehicle and to control the steering motor 7 and the driving motor 11.

A guide band 23 consists of a line formed by white paint or the like, white tape stuck on the path, aluminum tape stuck on the path, or the like. According to the result of various experiments, aluminum tape exhibited the best performance, although other materials are also acceptable. With such construction, only the elements $D_1$ to $D_7$ which have received reflected light from the guide band 23 provide signals $i_1, i_2, \ldots, i_7$.

Details of the control device 22 will be explained hereinafter with reference to FIG. 3. The detector 19 produces signals $i_1, i_2, \ldots, i_7$ as described above. These signals are applied to a signal discriminator 25. In accordance with given combinations of the signals $i_1, \ldots, i_7$, the discriminator 25 produces various control signals $P_1 - P_3$, $P_5 - P_7$, $P_P$, $P_S$ and $P_T$. The signals $P_1 - P_3$ and $P_5 - P_7$ are signals corresponding to required steering angles. The signal $P_P$ is a signal which makes the vehicle 1 pass through a following section, a working place or the like. Both the signals $P_S$ and $P_T$ are stop signals; the former is for an emergency stop and the latter is for a temporary stop. A signal $i_d$ from a sequence controller 27 is representative of the destination selecting signals $i_R$ and $i_L$. The sequence controller 27 provides a program for operation of the vehicle in advance. In this regard, the controller 27 may take the form of a logic circuit which generates the signals $i_R$ or $i_L$ in response to receipt of any one or a plurality of different combinations of the signals $i_1$ through $i_7$ from the detectors 19 at the input of discriminator 25. The sequence controller may also be selectively programmed, such as by a punched card, to generate the signals $i_R$ and $i_L$ in a prescribed sequence upon receipt of the output of counter 29. Various obvious combinations within the skill of the ordinary worker in the art will be apparent from the various operations desired.

In the discriminator 25, the following logical operations are performed.

$$P_j = (\bar{i}_1 \bar{i}_2 \ldots \bar{i}_{j-1} i_j \bar{i}_{j+1} \ldots \bar{i}_n)$$
$$+ (\bar{i}\bar{i} \ldots \bar{i}_{j-1} i_j i_{j+1} i_{j+2} \ldots \bar{i}_n)$$
$$+ (\bar{i}_1 \bar{i}_2 \ldots \bar{i}_{j-1} i_j i_L)$$
$$+ (i_j \bar{i}_{j+1} \ldots \bar{i}_n i_R)$$

(1)

$$P_P = \sum_{j=1}^{n-2} (i_j \cdot i_{j+1} \cdot i_{j+2})$$

(2)

$$P_T = (i_1 i_2 \ldots i_n)$$

(3)

Suffix n in the above Boolean algebra is equal to 7 in the case shown in FIG. 3. As well known, the above Boolean algebra may be easily embodied in an actual logic circuit by those skilled in this art. Each of the $P_j$ signals, which is a result of the Boolean algebra, is applied to corresponding relays 31 – 37, respectively. These relays 31 – 37 operate contacts $C_1 - C_7$ (FIG. 4), respectively.

The signal $P_T$, which means a temporary stop, is counted by a counter 29, and thereby the actual position of the vehicle is detected. Namely, the temporary stop signal $P_T$ is also used as a position detecting signal, besides as a signal for stopping the vehicle temporarily. In this case, as an example, the following operation is considered. The running path, that is to say the guide band, is divided into a plurality of phantom operating sections, where every branch of the path or every other operating point is contained. At a section beginning point on the guide band there is provided a light reflecting mark which means that the vehicle just enters the following section upon detecting the mark. Accordingly, the vehicle is able to detect its own position by counting the signals reflected from the marks.

In response to receipt of the contents of the counter 29, the sequence controller 27 produces the programmed signal $i_d$, which indicates the kind of operation to be performed in the section, such as stop for loading and/or unloading, rightward or leftward advance at the branch, passing through the section or the like. Thus, the sequence controller may take the form of a conventional sequencer.

In the case where the temporary stop signals must perform two stopping functions and the other operation simultaneously, as above mentioned, the vehicle has to stop at every entrance of the section. To eliminate such a requirement, a signal for detecting the position of the vehicle must be provided separately from the temporary stop signal, and otherwise, every method for the above purpose is easily conceivable for one skilled in the art.

Figure 4:
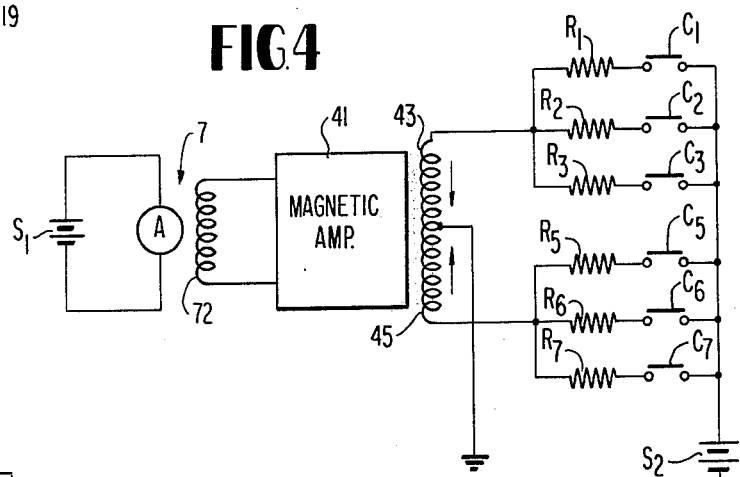

In FIG. 4 the steering motor 7 shown in FIG. 1 has an armature 71 and a field winding 72. The armature 71 is connected to a power source $S_1$ which is a part of the battery 15 shown in FIG. 1. The field winding 72 is excited by the output of a magnetic amplifier 41. The amplifier 41 has two input coils 43 and 45 so that two kinds of inputs of different direction are applied to the amplifier 41, as shown by the respective arrows. One end of each coil is connected together and to ground. The other end of the coil 43 is connected to a common connection point of a plurality of resistors $R_1 - R_3$ and contacts $C_1 - C_3$ connected in series thereto, respectively. Similarly, the other end of the coil 45 is connected to a common connection point of a plurality of resistors $R_5 - R_7$ and contacts $C_5 - C_7$ connected in series thereto, respectively. Other ends of the respective series connections are all connected together to one end of the power source $S_2$, the other end of which is grounded.

Figure 5:
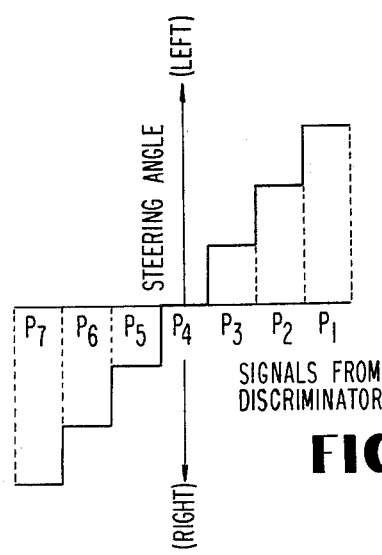
FIG. 5 is a diagram of the operating characteristic of the control circuit shown in FIGS. 3 and 4; and, FIGS. 6 to 9 are diagrams for explaining the various operations of the vehicle according to the present invention.

The values of the pairs of resistors $R_1$ and $R_7$, $R_2$ and $R_6$, and $R_3$ and $R_5$ are equal respectively; $R_1$ and $R_7$ are the lowest, $R_3$ and $R_5$ are the highest, and $R_2$ and $R_6$ are of intermediate value among the above resistors. Therefore, when one of the switches $C_1 - C_7$ is closed selectively, the input current of the magnetic amplifier 41 flows through the coil 43 or 45 in the respective directions as shown by the arrows according to the values of the respective resistors $R_1 - R_7$. The input current controls the output of the magnetic amplifier 41 which excites the field winding 72. Consequently, the and operation of the steering motor 7 changes the steering angle according to the signals $P_1 - P_7$, as shown in FIG. 5.

The operation of the above-mentioned control apparatus will be explained hereinafter with reference to FIGS. 4 – 9. It is assumed that the vehicle 1 is shifted rightwardly against the guide band 23, as shown in FIG. 6. Then, the element $D_2$ of the detector 19 produces the signal $i_2$ and the remaining detector elements do not produce any signals. In response to the signal $i_2$, the signal $P_2$ is produced by the discriminator 25, so that the relay 32 is excited. Accordingly, the contact $C_2$ is closed. The input current determined by the resistor $R_2$ flows through the input coil 43. The amplifier 41 produces an output to rotate the steering motor 7 with a left rotation, which causes the wheels 3 and 3' to angle toward the left with a predetermined steering angle, as seen in FIG. 5. Consequently, the vehicle 1 advances leftwardly, as shown by the arrow in FIG. 6. As the vehicle 1 advances leftwardly, the element $D_2$ of the detector 19 moves out of the zone of reflected light and the output $i_2$ is eliminated; however, the element $D_3$ now produces an output $i_3$. In response to the output $i_3$, the discriminator 25 produces a signal $P_3$ to excite the relay 33. The contact $C_3$ of the relay 33 is closed, and thereby the magnetic amplifier 41 produces an output which rotates the steering motor 7 so that the steering angle is changed to a smaller value in accordance with the signal $P_3$, shown in FIG. 5.

As above mentioned, as the vehicle 1 approaches the guide band 23, the the steering angle controlled by the steering motor 7 is decreased. Since the vehicle 1 runs at a constant speed, the correction of the shifted position of the vehicle 1 is smooth as the center of the vehicle 1 approaches the guide band 23. This is quite desirable in the correcting operation. When the center of the vehicle 1 coincides with the guide band 23 by the correcting operation as above described, the signal $i_4$ is produced by the detector 19, but no output of the discriminator 25 is produced. Therefore, the vehicle 1 advances in a straight course.

Next, a similar correcting operation is performed when the vehicle 1 shifts leftwardly with respect to the guide band 23, as shown in FIG. 7. Namely, the element $D_7$ of the detector 19 produces an output $i_7$, and thereby the discriminator 25 produces the signal $P_7$ to excite the relay 37. The contact $C_7$ of the relay 37 is closed and the magnetic amplifier 41 produces an output which rotates the steering motor 7 which causes the wheels 3 and 3' to turn rightward at an angle corresponding to the signal $P_7$ shown in FIG. 5. Consequently, the vehicle 1 advances in the direction as shown by the arrow in FIG. 7 and corrects the running direction thereof.

Further, referring to FIG. 8, the selecting operation which determines the advancing path of the vehicle 1 at a branch will be described hereinafter. When the vehicle 1 comes to a branch in the guide band 23, all the elements $D_1 - D_7$ of the detector 19 detect an additional portion 24 of the guide band 23, the width of which portion 24 is at least the same as or slightly wider than the vehicle. Therefore, the elements $D_1 - D_7$ produce all of the signals $i_1 - i_7$, so that the discriminator 25 produces the temporary signal $P_T$. The signal $P_T$ is counted by the counter 29 simultaneously with being applied to a driving control circuit (not shown). The content of the counter 29 is applied to the sequence controller 27. Thereby, the sequence controller 27 learns in what section the vehicle 1 is. The sequence controller 27 produces the signal $i_d$ according to the detected position of the vehicle 1. The signal $i_d$ is the signal which makes the vehicle 1 advance rightwardly or leftwardly. Namely, the signal $i_d$ to make the vehicle 1 advance rightwardly is represented by the signal $i_R$, and the leftward signal $i_d$ is represented by the signal $i_L$.

In FIG. 8 where both the elements $D_2$ and $D_6$ produce outputs $i_2$ and $i_6$ simultaneously, assuming that the signal $i_L$ is produced from the sequence controller 27, as only the third term with respect to $j = 2$ in the above-mentioned Boolean algebra for $P_j$ is satisfied, the discriminator 25 produces the signal $P_2$. Therefore, similarly to the description of FIG. 6, the vehicle 1 is advanced leftwardly as shown by the arrow in FIG. 8. In this manner, the vehicle 1 is advanced selectively at the branch. However, the additional portion 24 of the guide band 23 can be replaced by other and various combinations.

Further, as shown in FIG. 9, if the width of the guide band 23 becomes partially wider than that of the usual running portion so as to cover three of the elements, the elements $D_4 - D_6$ produce outputs simultaneously. Therefore, the above-mentioned Boolean algebra for $P_P$ is satisfied, so that the discriminator 25 produces the signal which causes the vehicle to pass through the following section.

As above mentioned, according to one of the embodiments of the present invention, the steering angle of the vehicle is controlled by the quantity of the shift of the center of the vehicle from the guide band, so that the steering control can be performed certainly against any large shift.

Having thus described the present invention, it is obvious that various modifications within the knowledge of workers in the art may be utilized without departing therefrom. It is to be understood also that although the invention has been described with specific reference to

What is claimed is:

1. An unattended traveling vehicle system comprising:

a vehicle having carrying means to carry an object thereon, wheels provided at the underside of said carrying means in order to cause said carrying means to travel on a traveling path surface, steering means to guide said wheels to respective steering angles in fixed increments to either side of a center direction in response to the magnitude of an applied steering signal of proper sense, and driving means for driving at least one of said wheels;

guide means arranged on said traveling path surface to guide said vehicle and having a different reflection factor from said path surface;

light optical means mounted on said vehicle consisting of means to direct light on said path surface including said guide means and plural detector elements to receive reflected light from said guide means to generate individual guide signals, said light receiving detector elements being juxtaposed at the underside of said carrying means substantially over the width of said carrying means; and control means for producing a steering signal of proper sense having a magnitude varying in fixed increments representing a required steering angle in accordance with the respective guide signals generated by said light receiving detector elements.

2. An unattended traveling vehicle system as defined in claim 1 wherein said guide means is provided with various changes in configuration along said traveling path, and said control means includes discriminator means for performing various operations by the logical detection of said guide signals which said light receiving detector elements generate at said guide means.

3. An unattended traveling vehicle system as defined in claim 1 wherein said vehicle is provided with a pair of driven wheels at one end of said carrying means and a pair of steerable wheels at the other end thereof, said steering means including a variable speed steering motor responsive to the magnitude and sense of said steering signal to rotate in fixed increments in either direction to respective steering angles and a steering gear arrangement connecting said steering motor to said steerable wheels.

4. An unattended traveling vehicle system as defined in claim 3 wherein said means to direct light on said path surface comprises an elongated light source disposed substantially over the width of said carrying means at the underside thereof.

5. An unattended traveling vehicle system as defined in claim 4 wherein said light receiving detector elements are disposed on said carrying means adjacent said light source and are provided with shield means for preventing direct illumination of said elements from said light source.

6. An unattended traveling vehicle system as defined in claim 4 wherein said control means includes discriminator means for generating selective control signals in response to receipt of respective combinations of said guide signals and motor control means for generating said steering signal of proper sense and having a magnitude variable in fixed increments in response to said control signals.

7. An unattended traveling vehicle system as defined in claim 6 wherein said control means further includes sequence control means responsive to one selected control signal from said discriminator means for controlling the direction of steering operation by controlling the sense of said steering signal.

8. An unattended traveling vehicle system as defined in claim 7 wherein said sequence control means includes a counter connected to said discriminator means to receive said one selected control signal and a sequence controller responsive to the output of said counter for controlling said discriminator means to generate a control signal providing for a steering signal of proper sense.

9. An unattended traveling vehicle system as defined in claim 1 wherein said control means includes discriminator means for generating selective control signals in response to receipt of respective combinations of said guide signals and motor control means for generating said steering signal of variable magnitude and sense in response to said control signals.

* * * * *